Nov. 1, 1955  V. M. DOBEUS ET AL  2,722,320
SIDE BOOM ATTACHMENT FOR TRACTORS
Filed April 21, 1951  6 Sheets-Sheet 1

INVENTORS:
Vander M. Dobeus and
John W. Carlson,
BY E. L. Borth,
ATTORNEY.

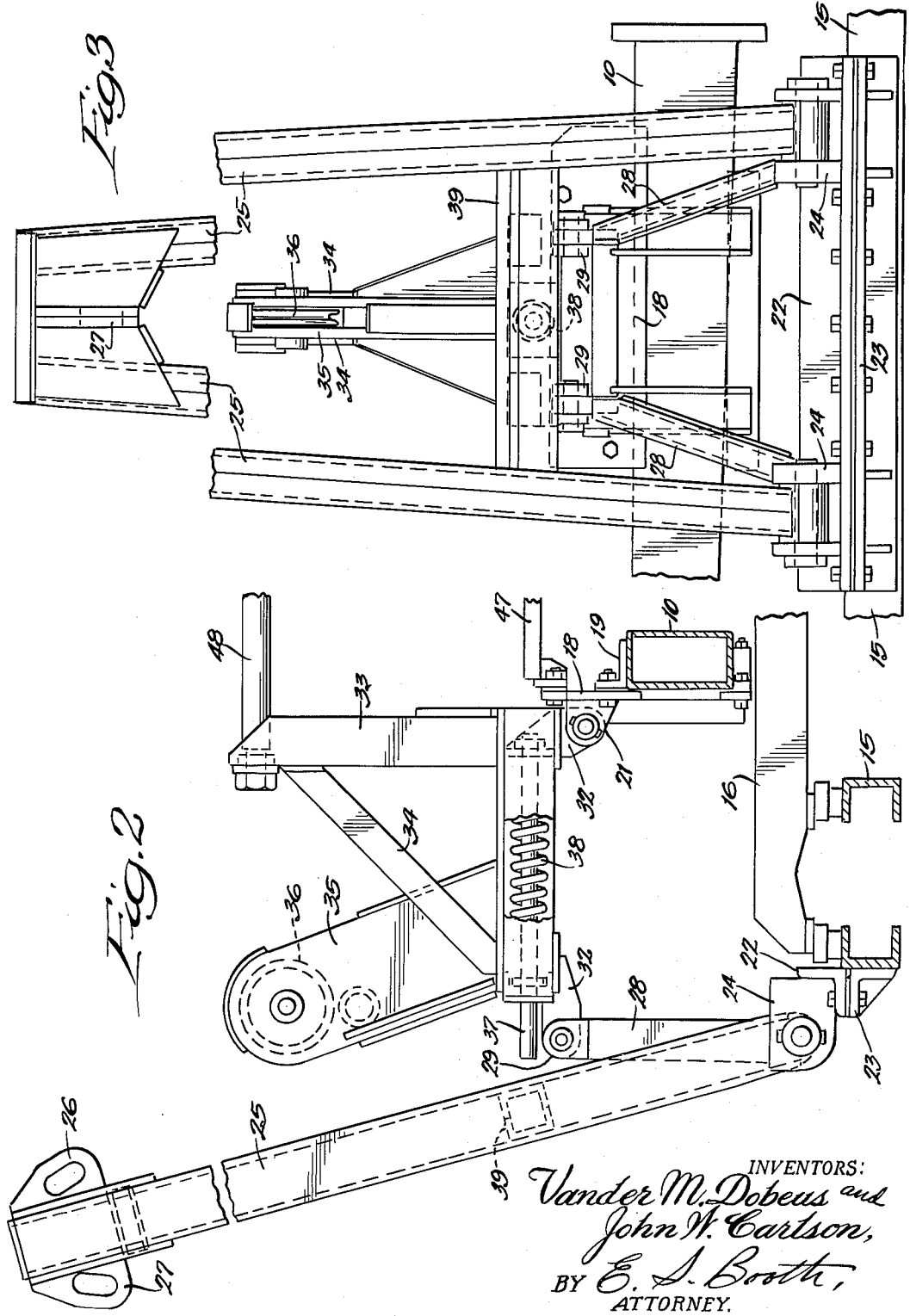

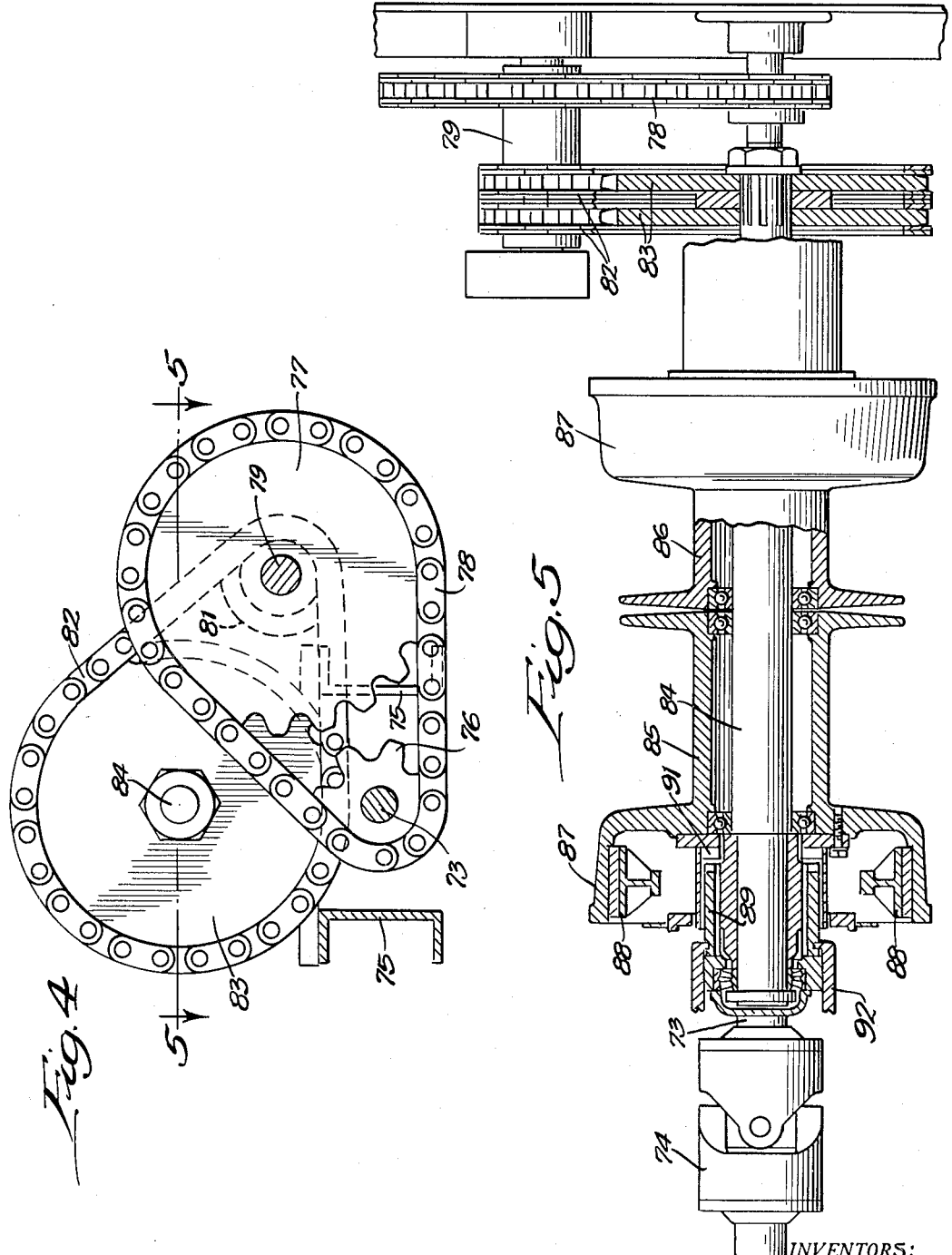

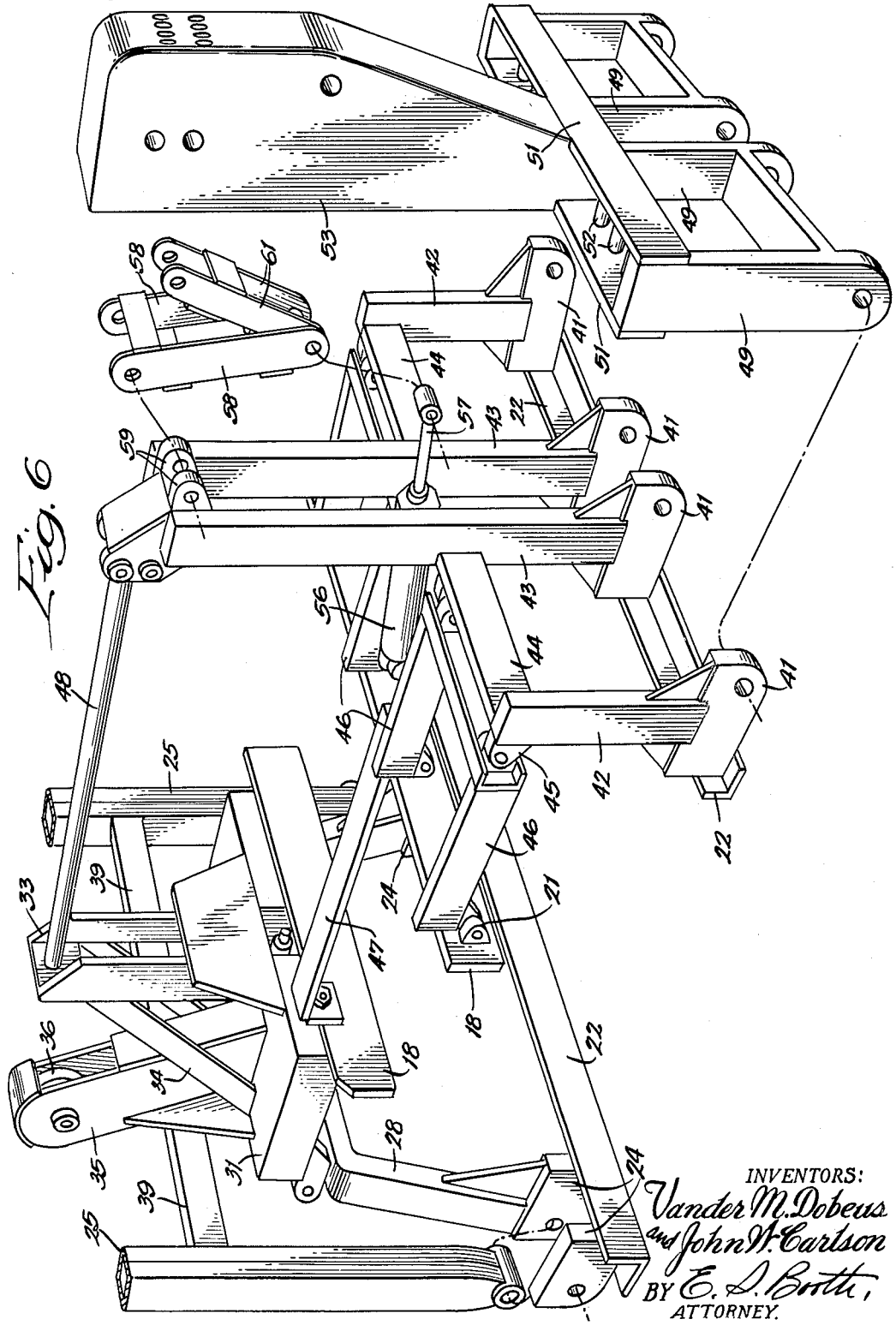

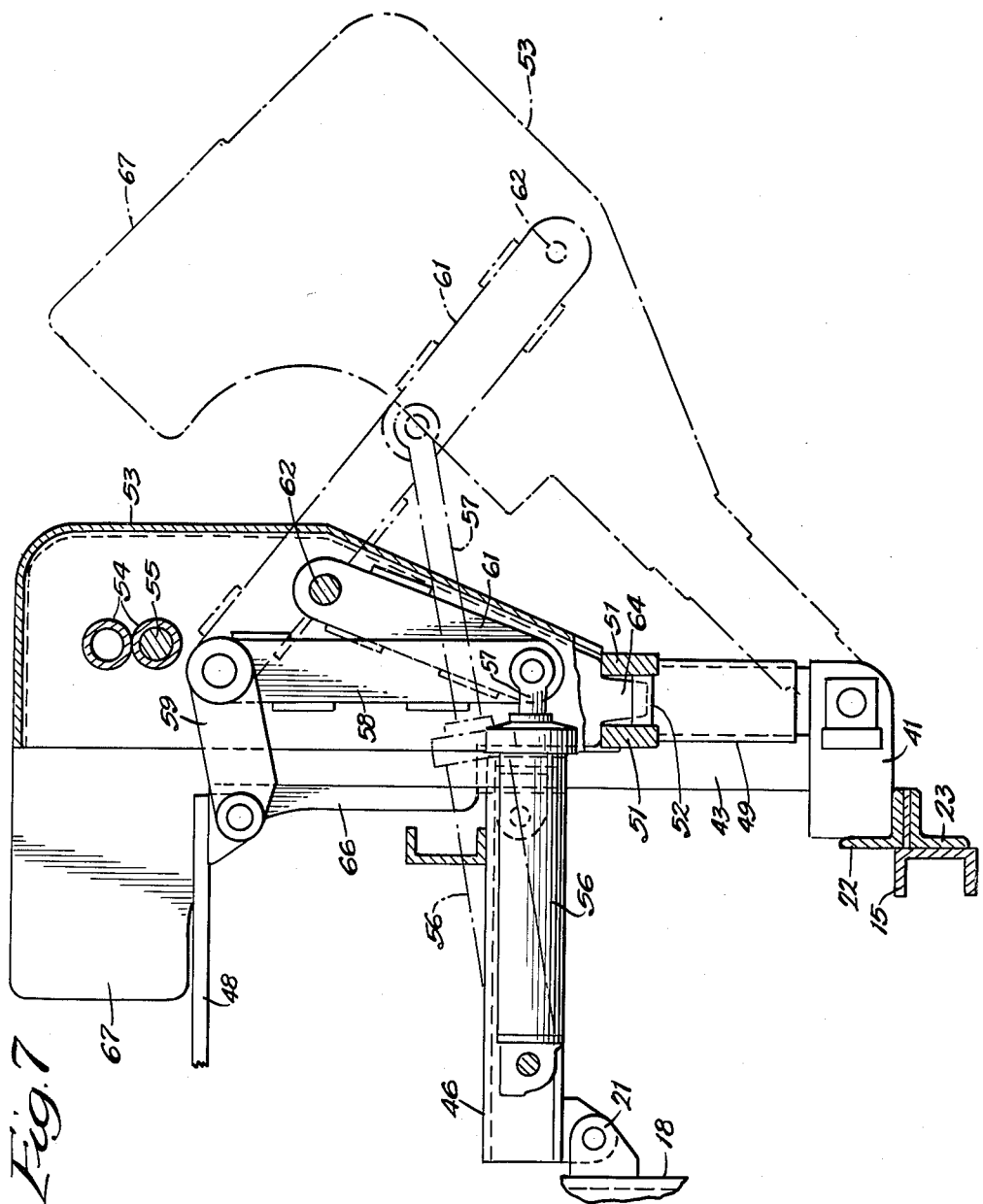

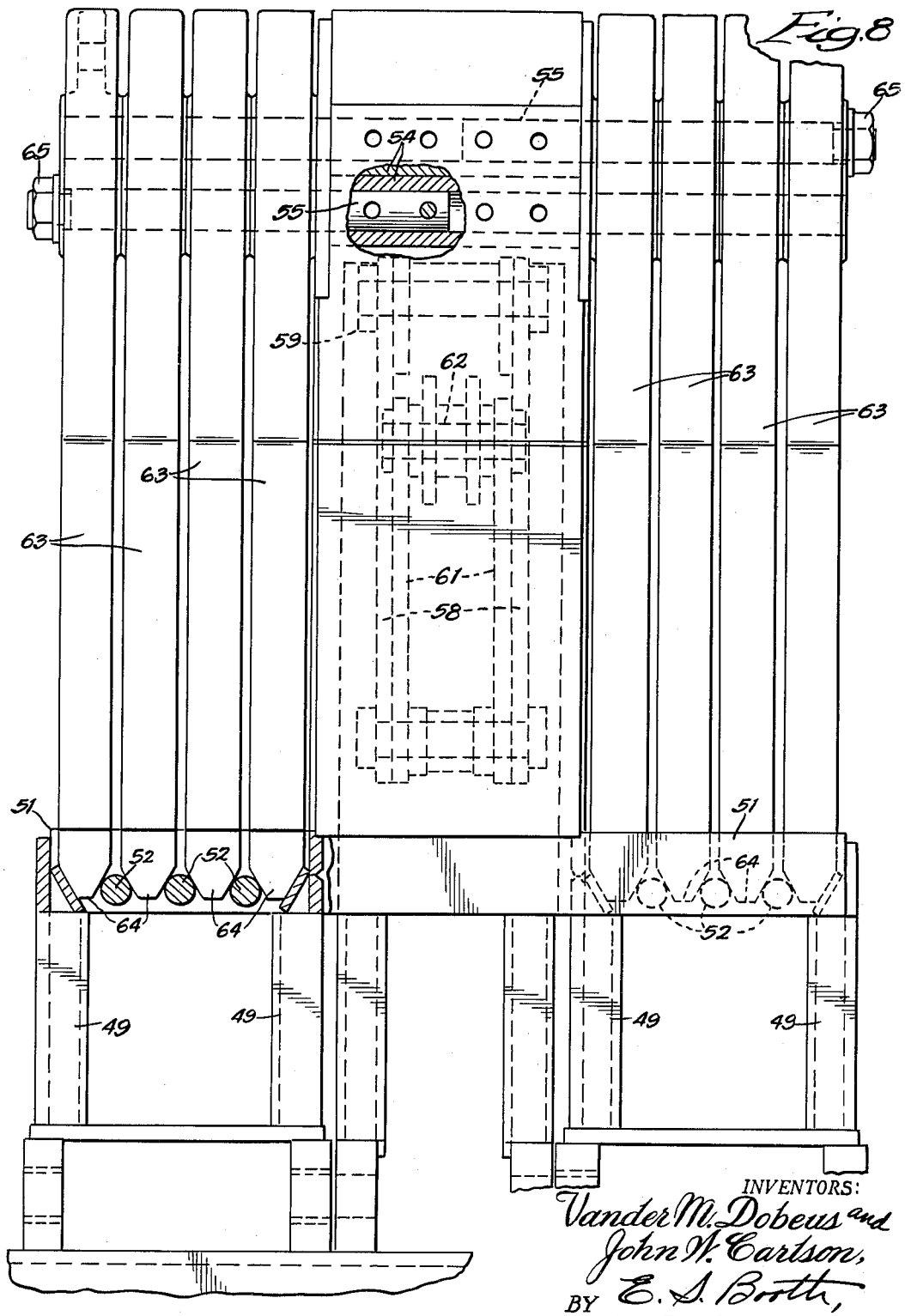

United States Patent Office 2,722,320
Patented Nov. 1, 1955

2,722,320

SIDE BOOM ATTACHMENT FOR TRACTORS

Vander M. Dobeus, Highland Park, and John W. Carlson, Deerfield, Ill., assignors to Tractomotive Corporation, Deerfield, Ill., a corporation of Illinois Application April 21, 1951, Serial No. 222,210

10 Claims. (Cl. 212—8)

This invention relates to side boom attachments for tractors, and more particularly to a side boom for use on relatively large crawler type tractors.

Side booms are used extensively on tractors for various types of lifting and transporting operations. One example is in pipe laying operations where the pipe, itself, and coating or covering tools, welding tools, and the like, are carried on side booms. Side boom attachments for this purpose must be capable of lifting and carrying heavy loads at one side of the tractor without creating excessive strains on the tractor frame, and without unbalancing the tractor.

It is one of the objects of the present invention to provide a side boom attachment which can easily be mounted on a tractor and which will handle heavy loads without unbalancing the tractor or excessively straining the tractor frame.

Another object is to provide a side boom attachment in which the parts can be assembled on the tractor and connected in assembled relation with each other without altering the tractor construction.

Still another object is to provide a side boom attachment in which the structural parts of the attachment, itself, absorb the major part of the strains incident to lifting and carrying loads so that the weight of the attachment and of the load constitutes substantially the only strains imposed on the tractor.

A further object is to provide a side boom attachment in which the boom and load lines are controlled through a winch mechanism arranged on the tractor to provide an optimum balance condition, both laterally and longitudinally, and for maximum ease of control.

According to one feature, winch drums are driven through a variable speed transmission mounted on one side and toward the rear of the tractor, and having an output or power shaft running under the winch drums and connected thereto through a speed reducing drive at the forward part of the tractor.

Another object is to provide a side boom attachment in which the load on the boom is counterbalanced by a counterweight pivoted on the other side of the tractor and controlled through a motor on the tractor.

In accordance with one feature of this construction, the counterweight is connected to the tractor through a toggle linkage which straightens when the weight is swung out from the tractor and which is operated by a fluid motor to control the weight.

According to a further feature, the counterweight is formed for easy mounting or removal of a series of weight members so that the total effective mass of the counterweight can easily be changed as required.

The above and other objects and features of the invention will be more readily apparent from the following description when read in connection with the accompanying drawing in which Figure 1 is a perspective view of a tractor equipped with a side boom attachment embodying the invention;

Figure 2 is a partial section at the boom side of the tractor;

Figure 3 is a partial elevation looking from the left in Figure 2;

Figure 4 is a partial section with parts in elevation showing a portion of the winch drive mechanism;

Figure 5 is a top plan view of the winch drive mechanism with parts in section;

Figure 6 is a perspective view of the side boom attachment frame structure in partially disassembled relationship;

Figure 7 is a side view with parts in section of the counterweight mechanism, and Figure 8 is an elevation of the counterweight mechanism with parts in section.

Figure 1:
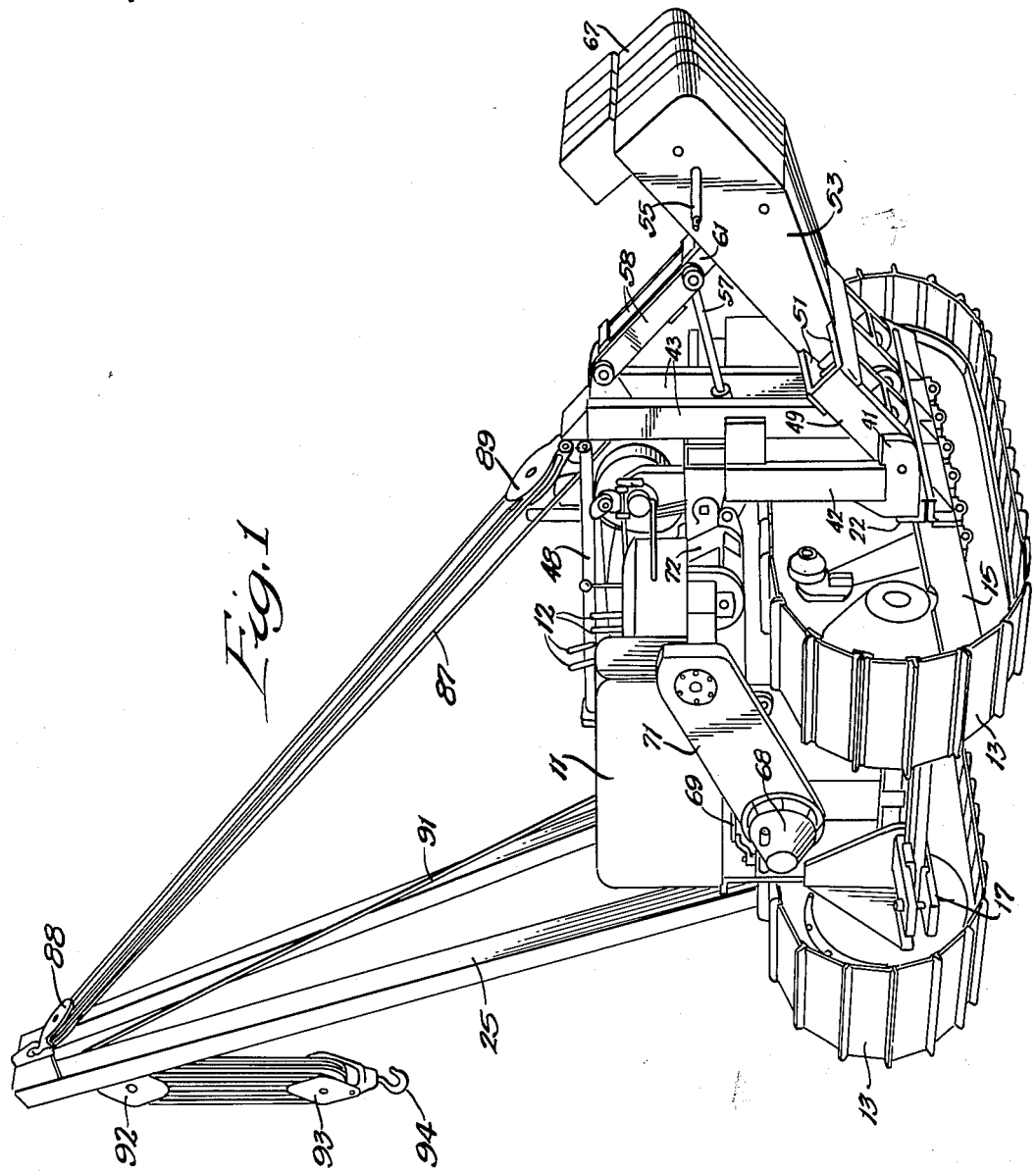

The attachment as illustrated in Figure 1, is mounted on a conventional type crawler tractor having a main frame or chassis including box section side rails 10 as best seen in Figure 2, which support an engine at the front portion of the tractor covered by the usual hood. At the rear part of the body an operator seat 11 is mounted with various controls for the tractor as indicated generally at 12, conveniently arranged in front of the operator's seat. The tractor is supported on crawler top treads 13 extending beyond the sides of the body at the lower portion thereof and supported on longitudinally extending frames 15, which are connected to the body through cross beams 16 as seen in Figure 2.

In the type of tractor illustrated, a power take-off shaft extends from the rear end of the tractor centrally of the body. At substantially the level of the treads, a hitch or coupling 17 is provided through which the tractor can be connected to a load to be drawn.

The side boom attachment of the present invention includes a frame structure which is best seen in its entirety in Figure 6. The frame structure includes a pair of side plates 18 which are adapted to be secured to the side rails 10 of the tractor through angle bars 19 welded or otherwise secured rigidly to the side rails. The plates 18 extend along the sides of the tractor and are formed on their outer surfaces with spaced sets of connecting lugs 21 for connection to other portions of the frame.

There are further provided, elongated mounting members 22 which may be L beams as shown, and which are secured to the outer sides of the track frames through brackets 23 welded or otherwise rigidly attached to the track frames as seen in Figures 2 and 3. The mounting members 22 at the boom side of the tractor carry two sets of spaced pivot blocks 24 which are spaced longitudinally of the tractor to provide pivotal mountings for an elongated boom 25. The boom as shown, includes a V-shaped frame with its lower ends spaced apart to fit between the sets of pivot blocks 24 for pivotal mounting thereon on a horizontal axis. At its upper end the side rails of the boom are connected and are formed with eyes 26 and 27 for connection of the boom lines and load lines to the outer end of the boom.

One block of each set 24 carries upwardly extending frame members 28 which are preferably in the form of an inverted U-shaped frame welded at its lower ends to the blocks 24. The upper ends of the vertical frame member 28 carries spaced eyes 29 for connecting the vertical frame member to a horizontal frame member or plate 31. The plate 31 carries projecting brackets 32 at its opposite sides to fit between the eyes 29 at one side and the lugs 21 at the other side to tie the entire side frame structure rigidly together. It will be seen that the frame structure as described, can easily be assembled on the tractor simply by inserting pins through the several lugs and eyes to form a rigid, extremely strong assembly.

The plate 31 carries an upwardly extending frame extension 33 lying adjacent to the side of the tractor and terminating at its upper end substantially at the level of the top of the tractor body. The frame extension 33 may be braced by diagonal braces 34 so that it is extremely rigid and strong. Additionally, the plate 31 may carry an upwardly projecting housing 35 which carries a guide pulley 36 at its upper end. The guide pulley 36 also preferably lies at substantially the level of the top of the tractor body to receive and guide a load line.

To avoid shocks incident to raising of the boom when it strikes the frame, the plate 31 also preferably carries a resilient bumper as best seen in Figure 2. As shown, the bumper is formed by a rod 37 projecting beyond the frame and resiliently urged outward by a spring 38. The boom is provided with a cross bar 39 at the level of the spring bumper to engage the end of the rod 37 when the boom is raised. The rod 37 and spring 38 cushion the boom during raising and also urge it out from a balanced vertical position to start it positively during lowering.

A somewhat similar frame is provided at the opposite side of the tractor including mounting blocks 41 welded or otherwise rigidly secured to the mounting member 22.

Vertical frame members 42 extend upward from the end blocks 41 to a level slightly above the top of the tracks 13 and central vertical frame members 43 extend upward from the central mounting blocks substantially to the level of the top of the tractor body. A cross piece 44 connects the vertical frame members 42 and 43 and is formed with lugs 45 through which it may be connected by pins to horizontal frame members 46. The horizontal frame members 46 are similarly connected through pins to the lugs 21 on the adjacent plate 18 so that the side frame construction can easily be assembled in place on the tractor.

To absorb cross strains incident to operation of the side boom, the plates 18 are preferably connected by a flat strip 47 extending across the tractor body at the floor level and placed so that it will not interfere with operation of the tractor by the operator. Additionally, a rigid cross member 48 which may be a pipe or a solid rod is connected at its ends to the upper ends of the vertical frame members 43 and the frame extension 33. The cross member 48 is mounted so that it can absorb either tension or compression loads, both of which may occur during normal use of the device.

Loads on the boom are adapted to be counterbalanced by a counterweight construction which is best shown in Figures 1, 6, 7 and 8. As best seen in Figure 6, the counterweight construction comprises a base formed of a plurality of vertical uprights 49 corresponding in spacing and number to the mounting blocks 41 to be pivotally connected thereto by pins on a horizontal axis. The upper ends of the uprights 49 are connected by side strips 51 which are connected at spaced points by short cross members 52. As best seen in Figures 7 and 8, the side strips 51 and cross members 52 define between them a series of spaced sockets or openings to support weight members as explained hereinafter.

The center uprights 49 preferably continue upward or are secured to separate upwardly extending pieces to form a hollow upright extension 53 which is of a length to extend approximately to or slightly above the level of the tractor body top. The upright housing 53 has its sides connected by vertically spaced, rigid tubes 54 as best seen in Figures 7 and 8, to receive weight supporting rods 55 which project outward from the sides of the upright 53. As seen in Figure 8, the tubes are provided with a series of openings therethrough to receive pins for anchoring the inner ends of the rods at any one of a plurality of spaced positions so that the length to which the rods project beyond the sides of the central upright can easily be adjusted.

The counterweight is adapted to be swung from a vertical position relatively close to the side of the tractor to an outward effective position as shown in Figure 1, by means of a motor shown as a fluid motor 56 mounted on the horizontal frame member 46. As best seen in Figure 6, the motor 56 comprises an elongated cylinder pivoted at one end to the horizontal frame members 46 and projecting outward between the vertical frame members 43. The cylinder contains a piston having an elongated piston rod 57 which may be moved in or out by controlling the supply of operating fluid to the cylinder through convenient control valves which are preferably mounted adjacent to the operator's seat.

To connect the fluid motor to the counterweight a toggle linkage as best shown in Figures 6 and 7, is provided. This linkage comprises upper links 58 pivoted at their upper ends to lugs 59 carried by the top of the vertical frame members 43. At their lower ends, the links 58 are connected to one end of links 61 which are pivoted at their other ends to a pin 62 carried by the upright 53. The end of the piston rod 57 is connected to the center joint between the links 58 and 61 as shown.

When the piston rod is drawn into the cylinder as shown in full lines in Figure 7, the toggle linkage will move to the position illustrated, to pull the weight inward to its vertical or ineffective position. To make the weight effective, the piston rod is moved outward so that the toggle linkage will tend to straighten and will move the weight outward. In the full outward position of the weight the toggle linkage lies in a straight line so that it holds the weight against further movement even though power is cut off from the cylinder 56. This positively prevents the weight from falling beyond the position shown and forms an important safety feature.

In order that the effective mass of the counterweight can readily be changed to suit different conditions, a plurality of weight members as illustrated at 63 are adapted to be mounted on the counterweight frame. Each of the weight members terminates at its lower end in a relatively narrow, tapered nipple 64 which is shaped to enter the sockets defined by the side members 51 and cross members 52. Each weight is therefore formed adjacent its upper end with a pair of spaced openings to register with the fastening rods 55. With this construction, a weight can be mounted on either side of the central upright 53 and the adjacent rod 55 can be extended through an opening therein to hold the weights firmly relative to the upright 53. Preferably, the desired number of weights are first set in position on the counterweight base and a rod 55 is then inserted through the weights into the corresponding tube 54 to be anchored in proper position therein by a pin. The outer end of each rod 55 may carry a nut 65 to draw the weights tightly against each other and against the side of the central upright 53. In this way, the weights may be easily and securely mounted so that the effective total mass of the counterweight can be properly adjusted to the size of loads to be handled.

The weight members 53 are preferably shaped as best seen in Figure 7, to project at their inner sides slightly beyond the inner edges of the central upright 53 as indicated at 66. At their upper ends the weights are formed with inwardly extending projections 67 which will extend over a winch mechanism mounted on the horizontal frame members 46 when the counterweight is in its vertical position. With this construction, the center of mass of the entire counterweight is maintained close to the side of the tractor when the weights are ineffective so that during times when the side boom is not in use, the balance of the tractor will be disturbed to a minimum extent.

The boom and a load line for the boom are adapted to be controlled through a winch mechanism which is driven from the power take-off shaft of the tractor. As best seen in Figure 1, the clutch 68 is mounted at the end of the power take-off shaft to be controlled from the operator's seat through a linkage partially indicated at 69. The clutch may drive a sprocket which is connected through a sprocket chain enclosed in a housing 71 with a second sprocket mounted at the input end of a variable speed transmission shown at 72. The transmission 72 may be of any conventional type which will provide several different speed and torque ratios and may be controlled conveniently from the operator's seat to produce the desired driving condition.

The transmission 72 is connected to an output shaft 73 through a universal joint 74 as best seen in Figures 4 and 5. The output or power shaft 73 extends immediately above the horizontal frame members 46 through a winch supporting frame 75 as seen in Figure 4. The shaft 73 terminates adjacent the front part of the tractor in a speed reducing drive mechanism shown as a sprocket and chain type of unit. As best seen in Figures 4 and 5, this mechanism includes a small sprocket 76 mounted on the shaft 73 and driving a large sprocket 77 through a chain 78. The large sprocket 77 is secured to a shaft 79 lying at the inside of the power shaft 73 and which carries a pair of smaller sprockets 81. The sprockets 81 are connected through chains 82 to sprockets 83 mounted on a winch driving shaft 84 which lies above and parallel to the input shaft 73. In this way, the shaft 84 will be driven at a lower speed and higher torque than the shaft 73 and the transmission and speed reducing drive will counterbalance each other longitudinally of the tractor, and both of them will tend to counterbalance the boom structure on the other side of the tractor.

A pair of winch drums 85 and 86 are rotatably mounted on the driving shaft 84. The drums are adapted to be held stationary through identical brake mechanism and to be drivably connected to the driving shaft 84 through identical clutch mechanism, only one of such mechanisms in connection with the drum 85 being illustrated. As shown, each drum is provided at one end with bell flange 87 formed with an inner cylindrical surface to provide a braking surface for engagement by brake shoes 88 mounted within the flange. The brakes may be controlled through any desired type of mechanical or hydraulic linkage from a position adjacent to the driver's seat to hold the drums stationary when desired.

For connecting the drums to the driving shaft 84, a shiftable clutch collar 89 is splined to the driving shaft and lies within the bell flange of each drum. The collar 89 is formed at one end with clutch teeth to mesh with complementary clutch teeth 91 formed on the interior of the drum thereby to connect the shaft and drum. The clutch collars 89 may be shifted through shift collars 92 controlled through any suitable type of operating linkage from a position adjacent to the operator's seat.

The drum 86 carries a cable 87 passing over a block 88 mounted in the eye 26 at the upper end of the boom and over a similar block 89 secured to the upper end of the frame uprights 43. By winding or unwinding the cable 89, the boom can be raised or lowered to the desired position and will be firmly held in such position when the brake for the drum 86 is engaged. It will be noted that the cable 87 and blocks 88 and 89 form a conventional block and tackle mechanism connecting the end of the boom to the attachment frame so that the boom can be raised and lowered even while supporting substantial loads with a relatively small power input.

The drum 85 carries a load line 91 which passes across the body of the tractor immediately beneath the cross member 48 and passes under the guide pulley 36. The load line 91 then passes over a guide pulley or block 92 which is connected to the eye 27 at the top of the boom and over a second block 93 which may carry a hook 94 or other desired type of load supporting device. By winding and unwinding the cable 91 from the drum 85, the block 93 and the load connected thereto may be raised or lowered as desired relative to the end of the boom.

In operation of the attachment the block 93 may be connected to a load which is to be picked up or moved with the boom 25 swung out to the proper position over the load.

The cable 91 may then be drawn on to the drum 85 to pick up the load to the desired position. After the load is picked up it may be swung toward or away from the tractor by winding or releasing cable from the drum 86 so that the load will be positioned at the desired distance from the tractor.

At the same time, the counterweight is preferably swung outward from the tractor through operation of the motor 56 properly to balance the weights at opposite sides of the tractor and to minimize tilting forces on the tractor.

When the load line 91 and the line 87 are under tension as when a load is being lifted or held, the upper ends of the upright frame members 43 tend to be pulled toward the boom side of the tractor by the tension on the lines. Under these conditions, the upper cross member 48 is under compression and is sufficiently strong and rigid to transmit the compressive forces to the attachment frame at the opposite or boom side of the tractor. Thus, twisting or bending forces on the tractor frame are minimized so that the tractor, itself, will not be damaged nor will its proper operation be interfered with. If the load is released while the counterweight is still swung out, the cross member 48 may be placed under tension by the counterweight. In this case also, the tension load will be transmitted by the cross member 48 from one side frame of the attachment to the other so that in this case also twisting or bending strains on the tractor frame are minimized.

With the present invention, a tractor can lift and transport relatively heavy loads at a substantial distance beyond the side thereof. The lifting and carrying of the load is at all times under complete control of the operator so that he can position the load accurately as desired. At the same time, the tractor frame is not strained nor is the normal operation of the tractor interfered with.

While one embodiment of the invention has been shown and described in detail, it will be understood that this is illustrative only and is not to be taken as a definition of the scope of the invention, reference being had for this purpose to the appended claims.

What is claimed is:

1. A side boom attachment for a tractor of the crawler type having a body and crawler track frames projecting beyond the sides of the body to support crawler tracks, the attachment comprising elongated plates formed for attachment to the sides of the tractor body, elongated mounting members formed for attachment to the outsides of the track frames, frames mounted on the mounting members and extending upward therefrom to points above the tracks, connections between the frames and the plates, a boom pivoted on a horizontal axis on one of the frames to swing outward from the tractor, winch mechanism on the other frame connected to the boom through a cable to move the boom, a connection between the plates extending across the tractor at substantially the level of the tractor floor, and a second connection between the top parts of the frames above the level of the last named connection.

2. A side boom attachment for a tractor of the crawler type having a body and crawler track frames projecting beyond the sides of the body to support crawler tracks, the attachment comprising elongated plates formed for attachment to the sides of the tractor body, elongated mounting members formed for attachment to the outsides of the track frames, frames mounted on the mounting members and extending upward therefrom to points above the tracks, connections between the frames and the plates, a boom pivoted on a horizontal axis on one of the frames to swing outward from the tractor, winch mechanism on the other frame including a block secured to the top part of the other frame, a cable controlled by the winch mechanism and passing over the block and connected to the boom to move the boom, a rigid connection between the plates extending across the tractor at substantially the level of the tractor floor, and a rigid connection between the top parts of the frames substantially at the level of the block.

3. A side boom attachment for a tractor of the crawler type having a body and crawler track frames projecting beyond the sides of the body to support crawler tracks, the attachment comprising elongated plates formed for attachment to the sides of the tractor body, elongated mounting members formed for attachment to the outsides of the track frames, frames mounted on the mounting members and extending upward therefrom to points above the tracks, connections between the frames and the plates, a boom pivoted on a horizontal axis on one of the frames to swing outward from the tractor, a pair of winch drums on the other frame, means to drive the drums selectively, a block secured to the top part of the other frame, a cable on one of the drums passing over the block and connected to the boom to raise and lower it, guide pulleys on the boom and on said one of the frames substantially at the level of the block, a rigid connection between the plates extending across the tractor at substantially the level of the tractor floor, and a rigid connecting member secured to the upper parts of the frames and extending across the tractor substantially at the level of the block and the guide pulley which is mounted on said one of the frames.

4. A side boom attachment for a tractor of the crawler type having a body and crawler track frames projecting beyond the sides of the body to support crawler tracks, the attachment comprising mounting members formed for attachment to the outsides of the track frames, vertical frame members extending upward from the mounting members to a level above the tracks, horizontal frame members extending between the vertical frame members and the sides of the tractor body, detachable connections securing the ends of the horizontal frame members to the vertical frame members and the sides of the tractor body, a boom pivoted on a horizontal axis on one of the frame members, winch mechanism mounted on the horizontal frame members on the side of the tractor opposite to the boom, a cable on the winch mechanism connected to the boom, a rigid connection between the horizontal frame members extending across the tractor at substantially the level of the tractor floor, and a rigid connecting member secured to the upper parts of the vertical frame members to extend across the tractor substantially at the level of the top of the body.

5. A side boom attachment for a tractor having a frame and a body comprising frames formed for attachment to the opposite sides of the tractor frame, a boom pivoted on one of the frames on a horizontal axis, winch mechanism mounted on the other frame and including a cable connected to the boom to raise and lower it, a counterweight pivoted on the other frame on a horizontal axis to swing from a position adjacent to the tractor to a position swung outward from the tractor, a fluid motor mounted on the other frame, and a toggle linkage connected at its ends to the other frame and the counterweight and at its center to the motor to straighten when the counterweight swings outward from the tractor.

6. A side boom attachment for a tractor having a frame and a body comprising frames formed for attachment to the opposite sides of the tractor frame, a boom pivoted on one of the frames on a horizontal axis, which mechanism mounted on the other frame and including a cable connected to the boom to raise and lower it, a vertically elongated counterweight pivoted at its lower end to the lower part of the other frame on a horizontal axis, a fluid motor mounted on the other frame, and a toggle linkage pivoted at one end to the upper part of the other frame, at its other end to the counterweight and at its center to the motor to straighten when the counterweight swings away from the tractor.

7. A side boom attachment for a tractor having a frame and a body comprising frames formed for attachment to the opposite sides of the tractor frame, a boom pivoted on one of the frames on a horizontal axis, winch mechanism mounted on the other frame and including a cable connected to the boom to raise and lower it, a counterweight including an elongated base pivoted at the lower part of the other frame on a horizontal axis and having a central upright projecting upward therefrom, vertically elongated weights formed at their lower ends to fit into the top of the base and to lie beside the upright, the weights projecting horizontally at their tops partially to overlie the winch mechanism when the counterweight is adjacent to the tractor, and power means on the tractor to control swinging of the counterweight.

8. A side boom attachment for a tractor having a frame and a body comprising frames formed for attachment to the opposite sides of the tractor frame, a boom pivoted on one of the frames on a horizontal axis, winch mechanism mounted on the other frame and including a cable connected to the boom to raise and lower it, a counterweight including an elongated base pivoted at the lower part of the other frame on a horizontal axis and having a central upright projecting upward therefrom, vertically elongated weights formed at their lower ends to fit into the top of the base and to lie beside the upright, the weight projecting horizontally at their tops partially to overlie the winch mechanism when the counterweight is adjacent to the tractor, a toggle linkage connected at one end to the top part of the other frame and at its other end to the central upright, and a fluid motor mounted on the other frame and connected to the center of the toggle linkage to move the counterweight.

9. In a side boom attachment for tractors, a counterweight comprising an elongated base formed at its lower edge for pivotal mounting on a horizontal axis and terminating at its top in spaced side rails, cross members connecting the side rails at spaced points and defining between them a series of spaced sockets, a central upright projecting upward from the base, a series of weights shaped at their lower ends to fit into the sockets and to lie beside the central upright, and fastening means to secure the upper parts of the weights to the uprights.

10. In a side boom attachment for tractors, a counterweight comprising an elongated base formed at its lower edge for pivotal mounting on a horizontal axis and terminating at its top in spaced side rails, cross members connecting the side rails at spaced points and defining between them a series of spaced sockets, a central upright projecting upward from the base, a series of weights shaped at their lower ends to fit into the sockets and to lie beside the central upright, fastening rods projecting outward from the sides of the upright, the weights having openings therein to receive the rods, and means to secure the rods adjustably to the upright.

References Cited in the file of this patent

UNITED STATES PATENTS

| Number | Name | Date |
|---|---|---|
| 1,344,659 | Sjoberg | June 29, 1920 |
| 1,756,106 | Swenson | Apr. 29, 1930 |
| 1,985,285 | Erdahl | Dec. 25, 1934 |
| 2,003,599 | Le Tourneau | June 4, 1935 |
| 2,077,741 | Cardwell | Apr. 20, 1937 |
| 2,261,870 | Cardwell | Nov. 4, 1941 |
| 2,325,089 | Zeilman | July 27, 1943 |
| 2,381,731 | Erdahl | Aug. 7, 1945 |
| 2,408,500 | West | Oct. 1, 1946 |
| 2,413,529 | Swaney | Dec. 31, 1946 |
| 2,425,663 | Wooldridge | Aug. 12, 1947 |

FOREIGN PATENTS

| Number | Country | Date |
|---|---|---|
| 327,478 | Great Britain | Apr. 10, 1930 |